United States Patent [19]

Heidelberg et al.

[11] Patent Number: 5,578,879
[45] Date of Patent: Nov. 26, 1996

[54] ELECTRIC MACHINE WITH FLUID COOLING

[76] Inventors: Götz Heidelberg, Am Hügel 16, 8136 Starnberg-Percha; Peter Ehrhart, Saalburgstr. 24a; Andreas Gründl, Hasenenystr. 20, both of 8000 Müchen 70, all of Germany

[21] Appl. No.: 538,616

[22] Filed: Oct. 3, 1995

Related U.S. Application Data

[63] Continuation of Ser. No. 383,674, Feb. 1, 1995, abandoned, which is a continuation of Ser. No. 842,369, Mar. 19, 1993, abandoned.

[30] Foreign Application Priority Data

Sep. 28, 1989 [DE] Germany ............... 3932481.8

[51] Int. Cl.⁶ .............. H02K 1/20; H02K 9/00; H02K 9/19; H02K 3/24
[52] U.S. Cl. ................. 310/54; 310/58
[58] Field of Search ............. 310/54, 58, 59, 310/86, 87, 88

[56] References Cited

U.S. PATENT DOCUMENTS

| | | | |
|---|---|---|---|
| 2,285,960 | 6/1942 | Fechheimer | 310/54 |
| 2,763,794 | 9/1956 | Baudry | 310/54 |
| 3,447,002 | 5/1969 | Rönnevig | 310/54 |
| 4,182,966 | 1/1980 | Mishra et al. | 310/59 |
| 4,227,108 | 10/1980 | Washizu et al. | 310/58 |
| 4,323,803 | 4/1982 | Danko et al. | 310/59 |
| 4,994,700 | 2/1991 | Bansal et al. | 310/54 |
| 4,995,159 | 2/1991 | Hancock et al. | 310/42 |
| 5,081,382 | 1/1992 | Collings et al. | 310/54 |

FOREIGN PATENT DOCUMENTS

| | | |
|---|---|---|
| 331180 | 9/1989 | European Pat. Off. . |
| 517949 | 5/1921 | France . |

*Primary Examiner*—Clayton E. LaBalle
*Attorney, Agent, or Firm*—Dickstein Shapiro Morin & Oshinsky LLP

[57] ABSTRACT

An electric machine comprising a winding-carrying stator part (4) and an armature part (6) movable relative thereto. The stator poles (10) and their winding (12) are mounted on a stator support (8) of U-shaped cross-section. The stator support (8) has formed therein flow spaces (30, 32) for a cooling fluid (34) flowing at least across partial regions of the stator pole winding (12).

5 Claims, 1 Drawing Sheet

ELECTRIC MACHINE WITH FLUID COOLING

This application is a continuation of application No. 08/383,674, filed Feb. 1, 1995, now abandoned, which is a continuation of application No. 07/842,369, filed Mar. 19, 1993, now abandoned.

The invention relates to an electric machine comprising:

(a) a stator part having stator poles and a current conductor winding;

(b) an armature (movable) part disposed opposite the stator part so as to leave an air gap therebetween and being in magnetic correlation with the stator part;

(c) the stator part and the armature part being movable relative to each other in a direction corresponding at least in essence to that direction in which the stator poles are arranged in succession, and (d) a fluid cooling being provided for the stator part. It is known to provide the stator part of such electric machines with a fluid cooling. Examples thereof are cooling fluid tubes provided in the stator part and the blowing of cooling air inwardly through the stator and outwardly along the stator, respectively. However, it has turned out that—in particular when an electric machine with high power density is desired—the known cooling types are not optimum, especially as regards the effectivity of the heat dissipation from the sites of heat generation as well as the constructive conditions.

It is an object of the invention to provide an electric machine comprising a fluid cooling for the stator part, which renders possible cooling in a particularly effective manner while having a constructionally favorable structure.

For meeting this object, the electric machine according to the invention is characterized in that (e) the stator poles and the winding thereof are mounted on a stator support which—as seen in a sectional view transversely to the afore-mentioned direction of arrangement of the stator poles—has a substantially U-shaped configuration including a base wall and two sidewalls and having a closing cover on its air gap side; and that (f) the stator support has formed therein a flow space for a cooling fluid flowing at least across partial regions of the stator pole winding.

Due to this configuration according to the invention, cooling fluid is canalized and passed along the stator pole winding in such a manner that at least partial regions of the stator pole winding are cooled directly by cooling fluid flowing thereacross. As is known, dissipated heat is created in electric machines primarily in the winding (often expressed by the catchword-like term "copper losses") and in the ferromagnetic stator (often expressed by the catchword-like term "iron losses"). Due to the fact that according to the invention cooling fluid is passed across the stator winding, the heat is discharged from the winding in particularly effective manner. Even though the cooling fluid may not flow directly across all parts of the stator winding, the cooling effect never-theless is very effective since the winding usually consists of a material having good current-conducting and, thus, also good heat-conducting properties, so that the heat in the winding easily flows to the fluid-cooled heat discharge regions. Furthermore, since the stator winding is mounted on the ferromagnetic stator, the dissipated heat from the stator material proper also flows via the winding material to the fluid-cooled heat discharge sites.

The term "electric machine" was chosen in order to cover primarily both electric motors and current generators. The use of the terms "stator part" and "armature or movable part" is not necessarily to be understood to the effect that the stator part is stationary and the armature part is movable relative to the stator part, although this configuration is the more usual and preferred one; an inverse configuration, i.e. stationary armature part and stator part moving relative to the armature part, is possible as well. The electric machine may be—to cite the two most important cases—either a rotary machine in which armature part and stator part move relative to each other in rotational manner, or a linear machine in which armature part and stator part move relative to each other in rectilinear manner. A fluid suitable for cooling may be a liquid or a gas, with a liquid being preferred because of the greater heat discharge capacity. Suitable cooling liquids are known, for instance from the field of transformer construction.

A preferred embodiment of the machine is characterized in that—as seen in the afore-mentioned sectional view transversely to the direction of arrangement of the stator poles—there are provided a first flow space between the stator poles and the first sidewall of the stator support as well as a second flow space between the stator poles and the second sidewall of the stator support, the two flow spaces extending along the stator pole series. In this manner the so-called winding heads or ends, which extend on both sides out of groove-like portions between respectively adjacent stator teeth, are cooled directly by cooling fluid. The heat conduction paths out of the interior of the groove-like portions to the winding heads are short. However, it is conceivable as well to leave also in the groove-like portions between the coils of adjacent stator poles enough space free for allowing the passage of cooling fluid, so that cooling fluid flows directly across the stator winding as a whole. The cooling fluid may flow through the first and second flow spaces either in successive manner or in parallel manner in terms of flow.

Furthermore, it is possible to provide connecting passages between the first and second flow spaces. These connecting passages extend as a rule transversely of the direction of extension of the two flow spaces. A constructionally particularly favorable solution provides the utilization of the spaces between the stator pole winding and the cover of the stator support as connecting passages. These "transverse passages" may be provided either at all locations between adjacent stator poles or only at a part of these locations. It is thus possible in particular to achieve the afore-mentioned successive flow through both flow spaces in a constructionally particularly simple manner by deflecting the cooling fluid from the first flow space at the portion of the stator remotest from the cooling fluid inlet by an angle of approx. 180° by way of one or more connecting passages provided there, so that the cooling fluid enters the second flow space in order to flow back.

In a particularly preferred embodiment of the invention at least some and preferably all of the stator poles are provided in their ferromagnetic material with interior flow passages. The result thereof is a direct interior cooling of the stator material. Furthermore, these flow passages can be utilized as partial sections of the overall flow path of the cooling fluid through the machine, as will become clearer further below.

A first possibility consists in having the inner flow passages of the respective stator poles extend substantially in the direction of arrangement of the stator poles, i.e. from one groove-like portion between two stator poles to an adjacent groove-like portion between two stator poles. However, other patterns of the inner stator pole flow passages are possible as well. What is functionally important, is primarily that inner flow passages extend through the respective stator poles.

A further particularly preferred embodiment of the invention consists in that the base wall of the stator support is provided therein with a flow passage extending substantially in the direction of arrangement of the stator poles. Cooling fluid flowing in this flow passage cools the stator material, preferably directly, from the end facing away from the air gap. This base wall flow passage, too, may be integrated in the overall cooling fluid cycle. In an equivalent manner, it is possible to provide this flow passage in the material of the stator instead of in the material of the base wall.

The on the whole most preferred embodiment is characterized in that the first and second flow spaces, transverse flow passages between adjacent stator poles, flow passages in the stator poles as well as the flow passage in the base wall or the stator material are connected in terms of flow such that the cooling fluid at first flows in the first and second flow spaces and then through transverse flow passages and flow passages in the stator poles into the discharge-collecting flow passage in the base wall. An inverse direction of flow, of course, is possible as well. In these cases the inner flow passages in the particular stator poles extend substantially from locations in the vicinity of the stator support cover, in particular from the connecting passages between stator pole winding and stator support cover, to the stator basis.

When an extremely high cooling intensity is desired, the stator winding may be provided such that, at least at those locations of the particular coil of the particular stator poles which have cooling fluid directly flowing thereacross, free spaces exist between conductor wires for allowing the cooling fluid to flow therethrough. In the most extreme embodiment, the coils of the individual stator poles are not wound "closely adjacent against each other"—as is usual—and filled with casting compound therebetween, but rather the conductor wires—for instance by using spacer-like elements—are wound in mutually spaced manner such that the cooling fluid can flow around the separate conductor wires. It is of course possible to have intermediate configurations in which conductor wire groups are wound in closely adjacent manner and in which the free spaces mentioned are present between conductor wire groups. The cooling according to the invention is provided preferably with electric machines having the constructional features mentioned hereinafter either separately or in combination:

Electronic commutation as it is known per se and thus need not be described herein in more detail.

Armature part having permanent magnets. Preferable in this respect are highly-coercive permanent magnets or permanent magnets of a material having a high energy product. Such permanent magnets are known per se and consist in particular of a material on the basis of one or more rare earth elements with cobalt or on the basis of iron neodymium material.

Construction of the armature or movable part in accordance with the flux concentration principle, as will be described in more detail further below.

The stator pole windings are each associated with one stator pole only and do not cross with coils of other stator poles. This leads to optimally small winding heads which are well suited for being cooled.

Construction of the machine in accordance with the multiple principle in which several analogous sub-units of the machine are each operable per se in independent manner. An example hereof is: A specific number of x stator pole coils is connected to a common electronic inverter means and to a common sensor for sensing the relative position of armature part and stator part for activating and deactivating or switching over of the separate coils in correct manner as regards time and sign. There are provided in total several of such sub-units so that, even in case of a failure of one of these sub-units, the machine remains operable, although with somewhat reduced power.

In most cases the direction of arrangement of the stator poles coincides exactly with the direction of relative movement of armature part and stator part. However, embodiments differing therefrom are possible as well.

The invention and developments of the invention will now be elucidated in more detail on the basis of preferred embodiments shown in the drawings in which FIG. 1 shows a machine in a first embodiment in a sectional view transversely to the direction of arrangement of the stator poles;

Figure 1:
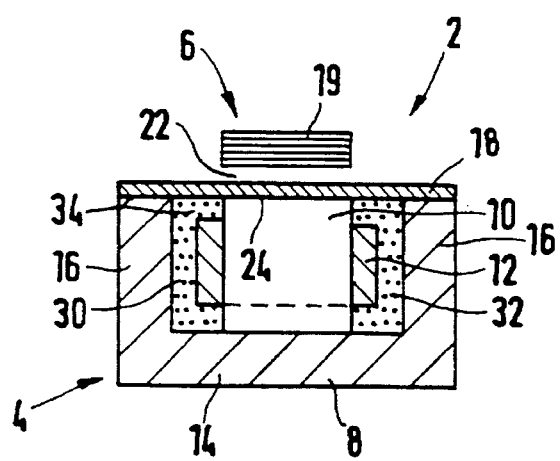
Figure 2:
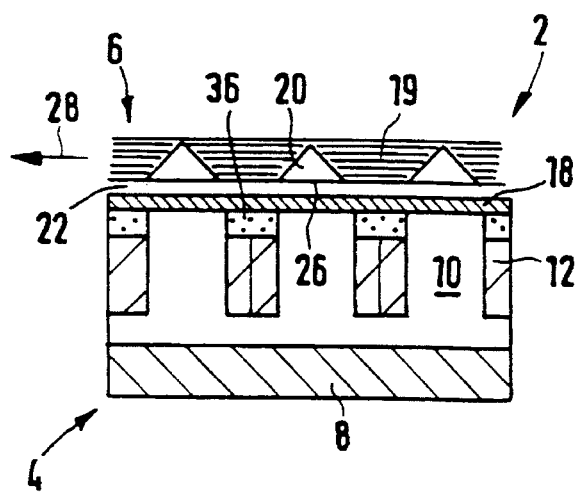
FIG. 2 shows the machine of FIG. 1 in a sectional view at right angles to the sectional view of FIG. 1, i.e. in a sectional view in the direction of arrangement of the stator poles.

The embodiment according to FIGS. 1 and 2 illustrates, at the bottom, the stator part 4 and, at the top, the movable or armature part 6 of the electric machine 2. The stator part 4 consists in essence of a stator support or carrier 8, the stator poles 10 and the coils 12 which are separately provided on each of the stator poles 10. As seen in the sectional view of FIG. 1, the stator support has a U-shaped configuration including a base wall 14, two sidewalls 16 and a cover 18 closing the open side of the "U" in fluid-tight manner. The sectional view of FIG. 2 reveals that a row of stator poles 10 is provided which are adjacent each other from the left to the right. Each individual coil 12 is, as seen in plan view (from the top in FIG. 1), of rectangular configuration with rounded corners. The individual stator poles 10 or stator teeth, on their side facing away from the cover 18, are in communication with each other via a magnetic flux path in that the material of the stator poles 10 at the bottom is passed around in U-shaped manner to the respectively adjacent stator poles 10. Each coil 12 reaches at the bottom the magnetic flux path, but at the top thereof it does not reach the cover 18.

In the armature part 6, there are trapezoidal permanent magnets 19 alternating with triangular flux conduction members 20. It is also possible that the permanent magnets 19 are triangular and the flux conduction members 20 of trapezoidal configuration. The permanent magnets 19 are magnetized, as seen in FIG. 2, from the left to the right. In the flux conduction members 20, the magnetic flux exiting from the permanent magnets 19 is deflected by 90° and passed via an air gap 22 into the upwardly directed stator pole areas 24. It is possible to see that, in plan view (from the top in FIGS. 1 and 2), the magnetic flux exit areas 26 of the flux conduction members 20 are smaller than the sum of the cross-sectional areas—visible in FIG. 1—of the two permanent magnets 19 adjoining the particular flux conduction member 20. The result hereof is a flux concentration at the particular magnetic flux exit area 26 of the particular flux conduction member 20. Machines operating in accordance with the flux concentration principle, as exemplified hereinbefore, often have a particularly high power density and, thus, heat generation in a narrow space. The specific effective cooling according to the invention is particularly advantageous in this respect.

It can be seen from FIG. 1 that between the individual coil 12 of the particular stator pole 10 and the two sidewalls 16 of the stator support 4 there are formed a first flow space 30 on the left-hand side and a second flow space 32 on the right-hand side for cooling fluid 34. Both flow spaces 30 and 32 extend along the row of stator poles 10 and the individual coils 12 associated therewith. It is perceivable that the cooling fluid 34 flowing in these flow spaces 30 and 32 flows across all individual coils 12 in those portions which (in FIG. 1) on the left-hand side and the right-hand side extend out of the stator grooves between adjacent stator poles 10. These portions are usually referred to as winding ends or heads. The cooling fluid 34 also flows across the upper surfaces of the winding heads facing the cover 18 as well as the lateral areas of the stator material which are free from winding.

It is possible to see, furthermore, that connecting passages 36 are formed between the individual coils 12 and the cover 18, which in FIG. 1 extend from left to right and in FIG. 2 at right angles to the drawing plane, between the first flow space 30 and the second flow space 32. By way of the connecting passages 36, the cooling fluid flows across the surfaces of the coils 12 located there and facing the cover 18 as well as across the stator pole portions 12 located there.

The cover 18 consists of a material which is magnetically and electrically not or only hardly conductive, such as for instance plastics material.

FIG. 2 is conceivable as being part of a linear motor in which the armature part 6 is movable relative to the stationary stator part 4 from right to left, in accordance with the arrow 28. However, FIG. 2 is also conceivable as illustrating a partial region of a rotary motor with external armature part, which is bent open so as to present a straight configuration. FIG. 2 would then be a cross-sectional view at right angles to the rotational axis of the motor located underneath FIG. 2; FIG. 1 would then be an axial section through the upper half of the motor.

Figure 3:
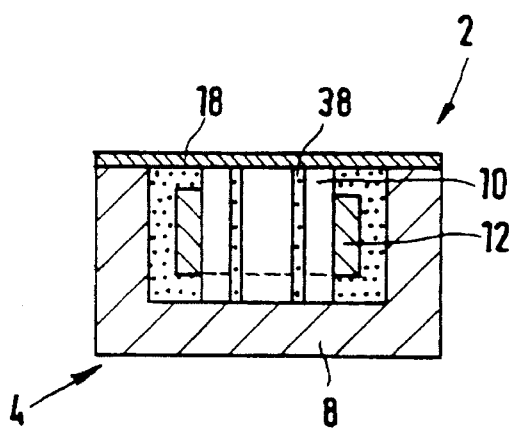
FIG. 3 shows a machine in a second embodiment in a sectional view as in FIG. 1, with the armature part of the machine being omitted.
Figure 4:
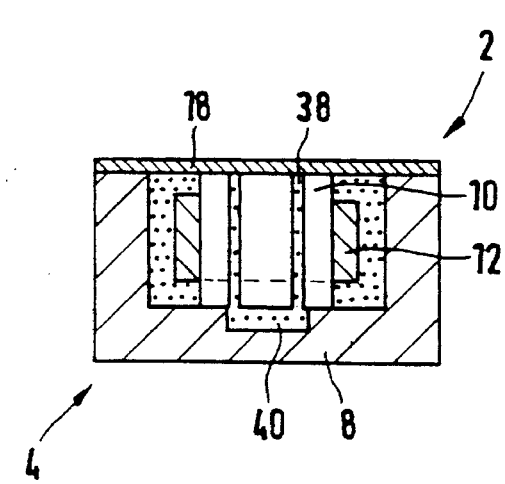
FIG. 4 shows a machine in a third embodiment in a sectional view as in FIG. 1, with the armature part of the machine being omitted.

The main difference between the afore-described embodiment according to FIGS. 1 and 2 and the embodiment according to FIG. 3 consists in that the stator poles 10 each have inner flow passages 38 which extend in the direction of arrangement of the stator pole series and connect the groove-like portion on the one side of the particular stator pole 10 and the groove-like portion on the other side of the particular stator pole 10 with each other and which are adapted to have the cooling fluid 34 flowing therethrough. In the sectional view of FIG. 3, the flow passages 38 have the configuration of a very narrow, upstanding rectangle with an inside width of less than 1 mm as measured horizontally in FIG. 3. Entrance and exit of the cooling fluid 34 are effected from the connecting passages 36. The embodiment according to FIG. 4 differs from the embodiment according to FIG. 3 in that the base wall 14 of the stator support 8 is provided on its inside with a recess 40 constituting a flow passage 40 extending in the direction of arrangement of the row of stator poles 10. This flow passage 40 communicates with the inner flow passages 38 of the respective stator poles 10. The flow passage 40 may also be located at a lower level in the base wall 14 and may be connected to the flow passages 38 via passageways.

The hydraulic design of this embodiment is such that the cooling fluid is supplied from one location to the two flow spaces 30 and 32 and flows along the flow spaces 30 and 32 across a longer or shorter distance, then flows through connecting passage sections and flow passages 38 away from the cover 18 to the foot of the particular stator pole 10 and then is collected in the flow passage 40 and is discharged from the stator support 8 at a suitable location.

It should be remarked in general that as a rule there is provided a closed cooling fluid circuit comprising a circulating pump and an external heat exchanger so that the cooling fluid 34 can be pumped properly through the flow spaces 30 and 32, optionally through connecting passages 36, optionally through flow passages 38 as well as optionally through the flow passage 40.

Furthermore, it should also be remarked in general that a feasible material for the stator poles 10 is first of all stacked ferromagnetic sheet material or the manufacture from pulverized ferromagnetic material that is bonded by means of plastics material. It is to be understood that the cover 18 closes the channel-shaped interior space of the stator support in fluid-tight manner. The total of the individual coils 12 of the stator poles 12 is referred to as stator winding in the introductory part of the specification.

Measures of per se known nature may be provided in addition for enhancing the heat transition from the stator material and/or the stator winding to the cooling fluid, in particular for a high cooling fluid flow velocity and/or purposeful turbulence increase.

We claim:
1. An electric machine, comprising:
(a) a stator part having stator poles and current conductor windings, said poles being aligned substantially in a first direction, each one of said windings being associated with a respective one of said stator poles;
(b) an armature part disposed opposite the stator part with an air gap therebetween, said armature part being in magnetic correlation with said stator part;
(c) said stator part and said armature part being movable relative to each other in said first direction;
(d) a stator support having a U-shaped cross section in a plane transverse to said first direction, said stator support including a base wall and first and second sidewalls, and a closing cover on the side of said air gap, said closing cover contacting said poles, and said poles and said windings being attached to said stator support;
(e) a first flow space for cooling fluid located between said stator poles and said first side-wall, and a second flow space for the cooling fluid located between said poles and said second side-wall, and wherein said first and second flow spaces extend along said stator poles such that the cooling fluid flows at least across partial regions of said windings, and wherein said first and second flow spaces contain said current conductor windings comprised of conductor wires spaced to allow said cooling fluid to flow between said conductor wires;
(f) a first flow passage for the cooling fluid extending substantially in the first direction, said first flow passage being provided in a base portion of said stator part; and
(g) second flow passages for the cooling fluid extending through at least some of said stator poles, said second flow passages being in communication with said flow spaces and said first flow passage; and
(h) wherein connecting passages for the cooling fluid are defined between at least some of said windings and said cover, and wherein said connecting passages communicate with said flow spaces and said second flow passages; and
(i) wherein said machine is arranged such that the cooling fluid flows along a path that extends through said first and second flow spaces, then through said connecting passages and said second flow passages, and then into said first flow passage.

2. An electric machine according to claim 1, wherein said machine (2) is an electronically commutated electric motor.

3. An electric machine according to claim 1, wherein said armature part (6) includes an exciter part, and wherein said armature part includes permanent magnets.

4. An electric machine according to claim 3, wherein said armature part further includes highly coercive permanent magnets (19).

5. An electric machine according to claim 3, wherein said armature part (6) is constructed with the permanent magnets (19) alternating with magnetic flux conduction members (20) in the first direction, and wherein the magnetic flux conduction members (20) have magnetic flux exit areas that are less than twice as large as the respective areas of the permanent magnets (19), as seen in the direction of the permanent magnet series.

* * * * *